(12) United States Patent
Tsoi et al.

(10) Patent No.: US 11,653,148 B2
(45) Date of Patent: May 16, 2023

(54) MODIFYING AND TRANSFERRING AUDIO BETWEEN DEVICES

(71) Applicant: Apple Inc., Cupertino, CA (US)

(72) Inventors: Peter C. Tsoi, San Jose, CA (US);
Adam S. Meyer, Cupertino, CA (US);
Karlin Y. Bark, Menlo Park, CA (US);
Matthew W. Brown, San Francisco, CA (US); Sean B. Kelly, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/916,738

(22) Filed: Jun. 30, 2020

(65) Prior Publication Data

US 2021/0029452 A1 Jan. 28, 2021

Related U.S. Application Data

(60) Provisional application No. 62/877,091, filed on Jul. 22, 2019.

(51) Int. Cl.
*H04R 3/12* (2006.01)
*H04R 3/04* (2006.01)
(Continued)

(52) U.S. Cl.
CPC ............... *H04R 3/12* (2013.01); *H04L 65/60* (2013.01); *H04R 3/04* (2013.01); *H04R 5/04* (2013.01); *H04S 7/303* (2013.01); *H04S 7/307* (2013.01); *H04R 2430/01* (2013.01); *H04S 2400/13* (2013.01)

(58) Field of Classification Search
None
See application file for complete search history.

(56) References Cited

U.S. PATENT DOCUMENTS 10,097,150 B1 * 10/2018 Peterson ................. G06F 3/165
2008/0081558 A1 * 4/2008 Dunko ................. G11B 27/002
455/41.1
(Continued)

FOREIGN PATENT DOCUMENTS

CN 101438604 5/2009
CN 106415721 2/2017
(Continued)

OTHER PUBLICATIONS

U.S. Appl. No. 62/811,962 of US 2020/0280800 (U.S. Appl. No. 16/805,182) (Year: 2019).*

*Primary Examiner* — James K Mooney
(74) *Attorney, Agent, or Firm* — Brownstein Hyatt Farber Schreck, LLP

(57) ABSTRACT

Certain embodiments relate generally to modifying audio playing on a first device based on detection of that audio by a second device. Other embodiments relate to transferring audio between a first device and a second device. More particularly, audio playing from a first device may be muted, stopped, or adjusted in volume based on detection of that audio by, or interaction with, a second device. Likewise, audio may be transferred from a first device to a second device based on communications between the first and second devices, proximity of the first and second devices relative to one another, proximity of a user to either the first or second device, and so on.

17 Claims, 14 Drawing Sheets

(51) Int. Cl.
*H04R 5/04* (2006.01)
*H04S 7/00* (2006.01)
*H04L 65/60* (2022.01)

(56) References Cited

U.S. PATENT DOCUMENTS

| | | |
|---|---|---|
| 2008/0226087 A1 | 9/2008 | Kinghorn |
| 2014/0242913 A1* | 8/2014 | Pang ................. H04M 1/72442 455/41.3 |
| 2015/0358768 A1* | 12/2015 | Luna .................... H04W 4/029 455/456.1 |
| 2016/0105754 A1* | 4/2016 | Carlsson ................ H04S 7/303 381/81 |
| 2016/0299669 A1* | 10/2016 | Bates ................. H04N 21/4325 |
| 2017/0003931 A1 | 1/2017 | Dvortsov et al. |
| 2017/0142533 A1* | 5/2017 | Park .................... H04R 29/007 |
| 2017/0357477 A1* | 12/2017 | Im ......................... G06F 3/0487 |
| 2018/0115844 A1 | 4/2018 | Lu et al. |
| 2020/0280800 A1* | 9/2020 | Wilberding ......... H04L 12/2812 |

FOREIGN PATENT DOCUMENTS

| | | |
|---|---|---|
| CN | 106454644 | 2/2017 |
| CN | 107431860 | 12/2017 |

\* cited by examiner

MODIFYING AND TRANSFERRING AUDIO BETWEEN DEVICES

CROSS-REFERENCE TO RELATED APPLICATION

This application is a nonprovisional of and claims the benefit under 35 U.S.C. § 119(e) of U.S. Provisional Patent Application No. 62/877,091, filed Jul. 22, 2019, the contents of which are incorporated herein by reference as if fully disclosed herein.

FIELD

The described embodiments relate generally to modifying audio playing on a first device based on detection of that audio by a second device. More particularly, audio playing from a first device may be muted, stopped, or adjusted in volume based on detection of that audio by, or interaction with, a second device. Audio may also be transferred from a first device to a second device.

BACKGROUND

As electronic devices have become more portable and mobile, their use has increased. In many cases people rely on multiple electronic devices for the same task, such as handling phone calls, listening to music, audible outputting messages or appointments, and so on. While this may provide many opportunities for a person to interact with his or her electronic devices and receive audible information, these interactions may be disjointed and uncoordinated. Further, public operation of such devices may be loud and intrusive to others.

SUMMARY

Embodiments of the systems, devices, methods, and apparatuses described in the present disclosure are directed to detecting, at a second device, audio playing from a first device, and using the second device to modify the audio output of the first device.

One embodiment takes the form of a method for modifying an audio output of a smart speaker, comprising: determining that a portable electronic device is in proximity with the smart speaker outputting audio; initiating, by the portable electronic device, a communication to the smart speaker; and outputting the audio from the portable electronic device after initiating the communication; wherein: the communication causes the smart speaker to modify the audio.

Another embodiment takes the form of a method for transitioning audio between a first smart speaker and a second smart speaker, comprising: determining a first distance between a person and the first smart speaker; in the event the first distance is less than a first threshold, outputting audio from the first smart speaker; otherwise, not outputting the audio from the first smart speaker; determining a second distance between the person and the second smart speaker; in the event the second distance is less than a second threshold, outputting the audio from the second smart speaker; and otherwise, not outputting the audio from the second smart speaker.

Still another embodiment takes the form of a method for modifying an audio output of a first smart speaker, comprising: detecting, at a second smart speaker, the audio output of the first smart speaker; determining that the audio output of the first smart speaker, as measured as by the second smart speaker, exceeds a threshold; and transmitting a communication from the second smart speaker to the first smart speaker; wherein: the communication instructs the first smart speaker to modify its audio output.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
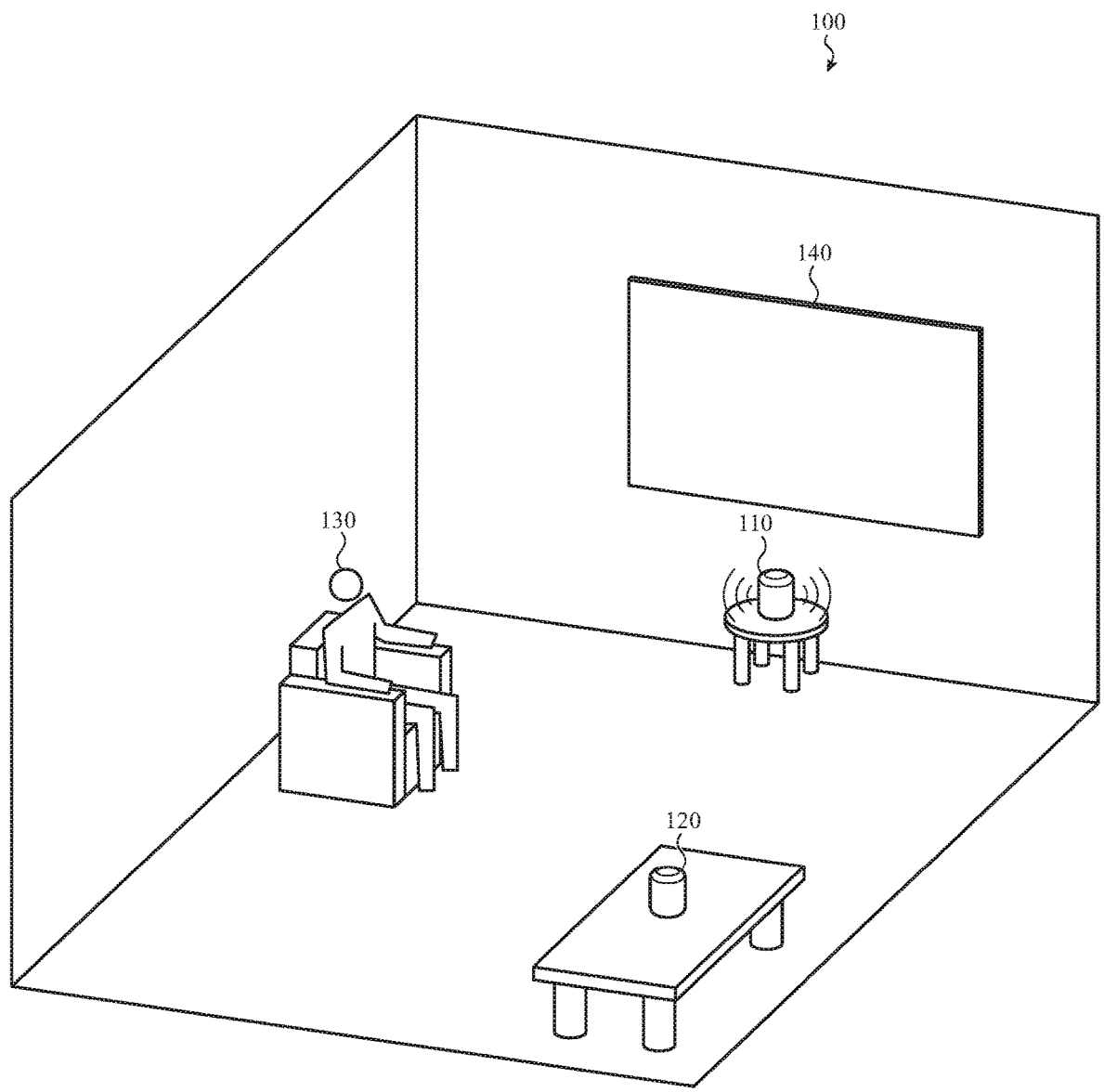
FIG. 1A depicts an example of a person listening to audio playing from a first device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The following disclosure relates to methods, systems, and apparatuses for detecting, modifying and transferring audio playing on (or from) a first device by using a second device. A "smart speaker" is a speaker capable of receiving and acting on commands issued by one or both of a person's voice or an electronic device. It should be noted that commands issued by an electronic device need not be audible to a person. Further, it should be appreciated that smart speakers need not be standalone; speakers integrated with an electronic device capable of receiving and acting on the aforementioned commands may also be "smart speakers" within the meaning of this document. Thus, speakers in a smart phone, tablet computing device, laptop computing device, personal digital assistant, appliance, vehicle, wearable device (such as a watch, glasses, or jewelry), and so on may all be smart speakers.

As one non-limiting example of embodiments described herein, a user may initiate audio playback (e.g., audio output) on a smart speaker. While listening to audio from the smart speaker, a user may bring a portable electronic device into proximity with the smart speaker. The portable electronic device may detect audio playing from the smart speaker or, alternately, may detect that it is within proximity of the smart speaker. The portable electronic device may determine what audio is playing (for example, what song) and a point in the audio that is currently being outputted. The portable electronic device may then begin playing a copy of that audio (e.g., the same song) at the same point and send a command to the smart speaker to cease audio playback. Thus, the portable electronic device may simulate receiving a song or other audio from the smart speaker and play that audio while the smart speaker ceases playback, which is one example of "transferring" audio from one device (e.g., the smart speaker) to another (e.g., the portable audio device). Accordingly, audio "transfer" between devices encompasses not only transmission of audio data between the devices, but also stopping audio output on a first device at a particular point in, or part of, the audio and starting audio output on a second device at the same point or part, thereby seamlessly outputting the audio to the listener, or overlapping audio on the devices during some transition part of the audio. A "transition part" is a segment or section of audio during which the audio may be transferred from a first device to a second device; the audio may stop playing from the first device during the transition part and may start playing from the second point during the transition part.

It should be appreciated that audio may fade out of playback from a first device and fade into playback from a second device in order to enhance seamless transfer, rather than abruptly transitioning from one device to another. Further, in some embodiments the fade out and fade in may occur at the same time, so that the audio overlaps from each device (e.g., an audio transition part may be played from a first device while fading out, and the same transition part played at the same time from a second device while fading in). "Fading" audio in or out refers to reducing a volume of the audio (fading out) or increasing a volume of the audio (fading in) across some time, generally until the audio reaches a certain volume or a certain time elapses. The certain volume may be a zero volume, a volume equal to the volume of the audio being outputted by a transferring device, full volume, a preset volume, and so on. The time may be a time during which audio is transferred, a set time, a time varying with one or more characteristics of the audio being transferred, a length of a transition part of the audio, and the like.

In some embodiments, an equalizer shift may be applied to audio output from the first and/or second device during audio transfer between devices, including during any fade out/fade in. The equalizer shift may cause the first device to mimic, simulate, or approximate an audio range, quality, spectrum, or other characteristic of the second device, or vice versa, so that audio outputs of the first and second device sound similar during audio transfer between the two devices. This may reduce a perception of a difference in audio quality between the first and second devices, at least during audio transfer between the devices, and contribute to a person's perception of seamless audio transfer. The equalizer shift may be gradually eliminated, for example during fade in or fade out of audio during an audio transfer, so that an audio output is no longer modified by the equalizer once the audio transfer is complete. Accordingly, an equalizer shift may occur with an audio fade, whether fading in or out, for a given device.

"Proximity," as used herein, means that two objects are sufficiently near each other that at least one of the objects may detect the other, whether electronically, optically, through audio, or in another suitable manner. As one non-limiting example, two electronic devices may be in proximity when they are near enough to electronically communicate with one another. In some embodiments, the distance between two objects in proximity with one another may vary depending on the communications network, protocol, frequency, and/or type used. For example, a smart speaker may be in proximity with a portable electronic device with which it communicates optically so long as they have a clear line of sight to one another Likewise, those same two objects may be in proximity with one another so long as they are within a certain distance of each other, regardless of line of sight, if they communicate via Bluetooth or another non-optical method. As yet another example, an electronic device that requires a wired connection to communicate with a smart speaker may have its proximity to the speaker limited to the length of a physical cable connecting the two. As yet another example, an object (such as a person) may be in proximity to an electronic device when the electronic device can detect the person's location and/or presence.

A "portable electronic device," as used herein, is any electronic device that is designed to be routinely carried by a user without excessive effort for an extended time. Accordingly, smart telephones, tablet computing devices, wearable devices (such as watches, glasses, jewelry, clothing, and the like), and laptop computing devices are all examples of portable electronic devices, while desktop computing devices, servers, appliances, and the like are not. Other portable electronic devices may include personal digital assistants, media players, headphones, and so on.

A non-limiting example of another embodiment described herein is a system to modify audio in accordance with a person's motion. In the example, a person may be standing near a first smart speaker, listening to audio outputted by the first smart speaker at a first volume. The person may walk away from the first speaker and towards a second speaker that is not outputting any audio.

As the person moves, the first smart speaker may adjust the first volume to account for the person's new position. Likewise, the second smart speaker may begin playing the same audio, at the same point in the audio, to account for the person moving closer to the second smart speaker. As the person continues to approach the second smart speaker, the first smart speaker may continue to modify the first volume, potentially ceasing to output audio at all. Likewise, the second smart speaker may modify a second volume of its audio output as the person moves, eventually reaching the first volume when the person is sufficiently close to the second speaker.

In this fashion, the first and second smart speakers may transition audio between them as the person moves between them to provide a substantially seamless listening experience. The first and second smart speakers may cooperate to provide the audio at a constant or near-constant volume, as perceived by the person, even as the person moves. Further, the first and second smart speakers may determine a person's location and/or motion either through sensors built into the smart speakers for such a purpose (such as optical sensors or other positional sensors designed to detect a position and/or motion of a person) or by being in communication with, and tracking a location and/or motion of, a portable electronic device carried by the person. In some embodiments, the portable electronic device determines distances to the first and second smart speakers rather than the opposite.

Yet another embodiment described herein takes the form of a system for modifying audio output intended for, or under the control of, a first person in order to avoid impacting a second person. As mentioned above, audio may transition between two smart speakers (e.g., be "transferred") as a person moves. For example, as a person walks from a first room to a second room, audio may transition from a first speaker in the first room to a second speaker in the second room, as described above.

In this example, the second smart speaker may be sufficiently close to a second person that its audio is perceptible to the second person, or is above a threshold set by the second person. As one non-limiting example, the second person may be sleeping and set the threshold at a level where it is unlikely he or she is woken by the audio from the second smart speaker.

Still continuing the example, a third smart speaker may be near the second person. When the third smart speaker detects audio above the threshold, it may transmit an instruction to the second smart speaker to reduce a volume of its audio output. Once the audio output of the second smart speaker is below the threshold, the third smart speaker may optionally transmit a confirmation that the audio is at a proper level. Accordingly, even as the first person moves and the audio "follows" him or her, it may be adjusted to prevent undue impact on another person.

As yet another example of embodiments disclosed herein, a smart speaker may be connected to a remote electronic device (whether or not portable). The remote electronic device may transmit instructions to play audio (and/or audio itself) to the smart speaker. The smart speaker, in turn, may output the audio. In this manner, the speaker may play sound effects in a location other than the electronic device. This may enhance audiovisual playback by creating atmospheric sound effects, provide notifications to a person near a smart speaker in a remote room, and so on. Further, the audio played by the remote smart speaker may be customized or otherwise altered according to a relative location of a person, an identity of a person, a number of people near the smart speaker, and the like.

FIG. 1A depicts a sample environment 100 in which one or more smart speakers 110, 120 may operate. Although the environment 100 is shown as a single room, it should be appreciated that it may be multiple rooms, an outdoor location, a combination of indoor and outdoor locations, and so on.

The environment 100 may include one or more electronic devices 140 other than the smart speaker(s) 110, 120, or it may not. If another electronic device is present, such as the television shown in FIG. 1A, a smart speaker (such as the first smart speaker 110) may play sound synced to operation of the electronic device. For example, the smart speaker 110 may play audio for a movie shown on the electronic device 140. The smart speaker 110 may operate independently of any other electronic device 140, as well. In some embodiments, the television or other electronic device may incorporate a smart speaker or other electronic device suitable to transfer audio, as described herein.

As shown in FIG. 1A, a person 130 may listen to audio from the first smart speaker 110 while the second smart speaker 120 is silent. However, as the person moves about the room, he may desire to listen to the audio from the second smart speaker 120 instead of the first smart speaker 110, for example because he is closer to the second smart speaker 120.

Figure 1B:
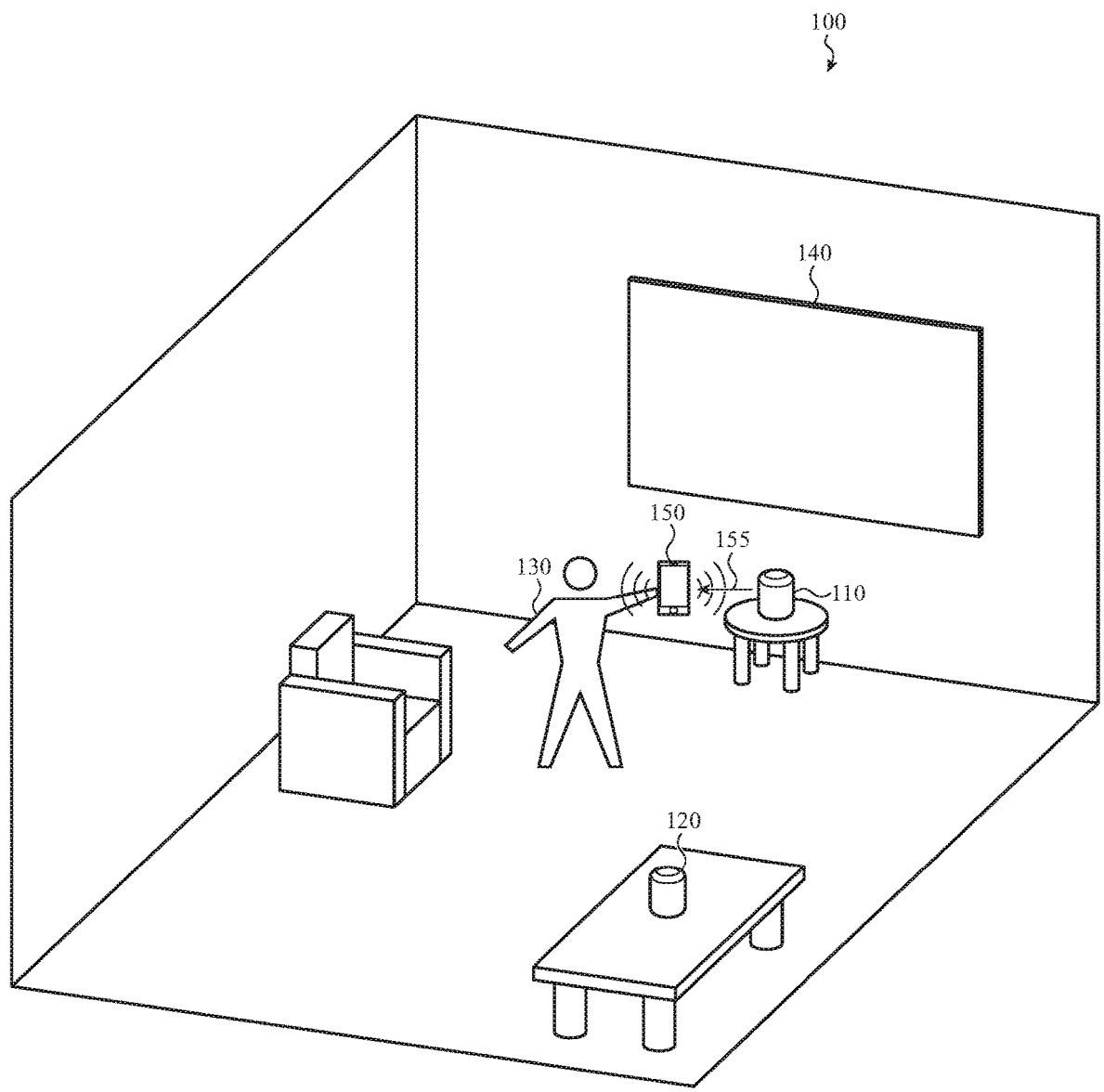
FIG. 1B depicts the person of FIG. 1A transferring the audio from the first device to a second device.

Accordingly and as shown in FIG. 1B, the person 130 may bring a portable electronic device 150 into proximity with the first smart speaker 110. The portable electronic device may communicate with the first smart speaker 110 to determine what audio is playing and what point in the audio is currently being outputted. The portable electronic device 150 may then play the same audio from the same point while the first smart speaker ceases playing the audio, as shown in FIG. 1B. In accordance with the foregoing definition, this may be referred to as "transferring" the audio from the smart speaker 110 to the portable electronic device 150.

Various communications 155 may take place between the first smart speaker 110 and portable electronic device 150. For example, the portable electronic device 150 may transmit a command to provide identifying audio information, audio, a current point of play for audio, and the like to the smart speaker 110. In some embodiments, the communication may prompt the portable electronic device 150 to determine whether it stores a copy of the audio and/or report whether it stores a copy of the audio to the smart speaker 110. If the portable electronic device 150 does not store a copy of the audio, such a copy may be transmitted from the smart speaker 110 to the portable electronic device, the portable electronic device may download a copy of the audio from a remote storage location, or the portable electronic device may refuse any audio transfer.

Likewise, the audio outputted by the smart speaker 110 may be a form of communication with the portable electronic device 150; as one example, the portable electronic device 150 may use a volume of the audio to determine whether it is in proximity with the smart speaker 110. Alternately, the portable electronic device 150 may identify or otherwise recognize the audio played by the smart speaker, thus again making the audio an example of a communication 155. The communication 155 may be an optical communication between the smart speaker 110 and the portable electronic device 150 used to determine proximity between the two, and may be initiated by either. The communication 155 may be an instruction to the first smart speaker 110 from the portable electronic device 150, such as an instruction to stop audio output, or vice versa.

In some embodiments the communication 155 is initiated in response to a motion or gesture with, or on, the portable electronic device 150. An incorporated sensor, such as a gyroscope, accelerometer, magnetometer, optical sensor, or the like may measure movement of the portable electronic device 150 and a processor incorporated into the portable electronic device 150 may correlate such motion to a particular gesture, command, or other input. As one non-limiting example, a communication 155 may be initiated when the portable electronic device 150 is pointed at the smart speaker 110. As another example, audio may be transferred from the smart speaker to the portable electronic device in response to pointing the portable electronic device at the smart speaker. Such transfer may involve multiple communications 155, as discussed below with respect to FIG. 2.

It should be appreciated that a portable electronic device 150 may be "pointed" at a smart speaker 110, 120 when a particular part of the portable electronic device is oriented toward the smart speaker 110, 120. For example, a person may rotate the portable electronic device 150 such that a top of the portable electronic device is closest to the smart speaker. As yet another option, the person 130 may initiate or confirm audio transfer by providing a command or acknowledgement to either the portable electronic device 150 or smart speaker 110, 120.

Figure 1C:
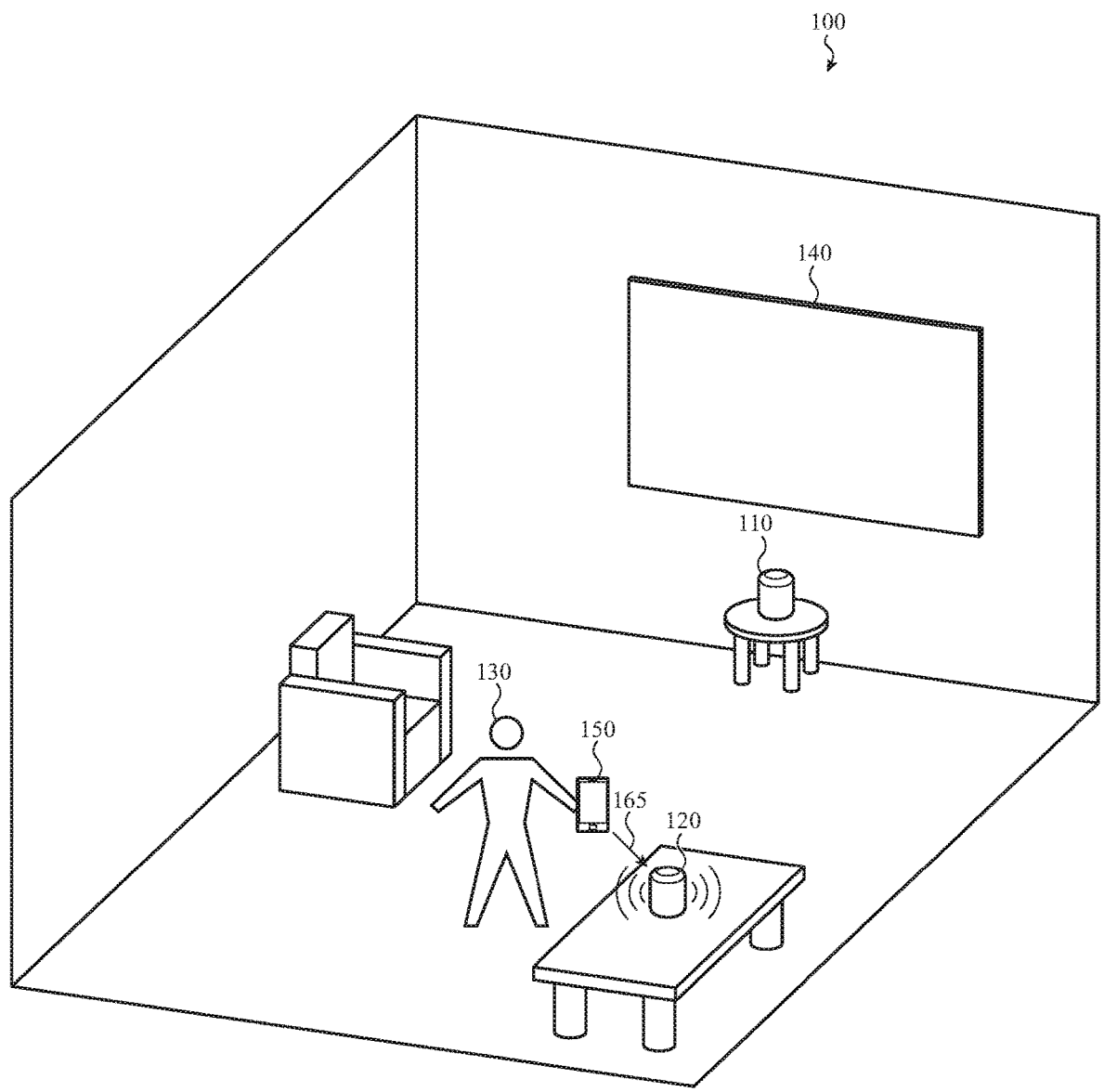
FIG. 1C depicts the person of FIG. 1A transferring the audio from the second device to a third device.

Just as audio may be transferred from the smart speaker 110, 120 to the portable electronic device 150, so too can audio be transferred from the portable electronic device to a smart speaker. FIG. 1C shows an example of a person 130 transferring audio from his or her portable electronic device 150 to a second smart speaker 120 in the environment 100. Again, although the first and second smart speakers 110, 120 are shown in a single room, they may be in separate rooms or locations.

In certain respects, transferring audio from the portable electronic device 150 to the second smart speaker 120 is the reverse of transferring audio from the first smart speaker 110 to the portable electronic device 150, as described above with respect to FIG. 1B. That is, the person 130 may bring the portable electronic device 150 into proximity with the second smart speaker 120 and initiate a second communication 165. As discussed above, the second communication 165 may transmit a file (such as the audio) from the portable electronic device 150 to the second smart speaker 120 or may transmit a command from the portable electronic device 150 to the second smart speaker 120. Regardless, the communication 165 may transfer audio from the portable electronic device 150 to the second smart speaker 120, such that the portable electronic device 150 stops playing audio at a transition part or point and the second smart speaker begins playing audio at the transition part or point, and at substantially the same time the portable electronic device stops outputting the audio. Thus, to the person 130, the audio playback is substantially uninterrupted (e.g., the person's perception is that the audio does not stop).

Further, some embodiments may copy or transmit audio from one device to another in order to facilitate audio transfer between the devices. With respect to the example shown in FIGS. 1A-1C, a device outputting audio to be transferred (such as the smart speaker 110 in FIG. 1A, or the portable electronic device 150 in FIG. 1B) may determine whether the device to which the audio is being transferred stores a copy of the audio. In some embodiments, the device to which the audio is being transferred may determine whether it stores a copy of the audio to be transferred, and may communicate that information to the transferring device.

If the device to which audio is to be transferred does store a copy of the audio, then the transferring device (e.g., the device currently outputting audio) and the device to which audio is to be transferred may coordinate the transfer by determining one or more transition parts of the audio, as discussed above. The transferring device may stop or otherwise modify audio output at the transition part while the device to which audio is being transferred may initiate audio output at the transition part, thus providing a perceptually seamless or uninterrupted audio output between the two devices. If the second device (e.g., the device to which audio is being transferred) does not store a copy of the audio, the first device (e.g., the device currently outputting audio, such as the smart speaker 110 in FIG. 1A or the portable electronic device 150 in FIG. 1B) may communicate a copy of the audio to the second device. After the second device receives the copy of the audio, one or both of the devices may determine the transition part at which audio is to be transferred and then transfer the audio.

In certain embodiments, the audio may fade out from a first device, such as the portable electronic device 150, and fade in from a second device, such as the smart speaker 110, as audio transfer occurs between the two devices (or vice versa). This fading of audio between the devices creates a more natural transition of audio than an abrupt cessation of audio output from the portable electronic device 150 and initiation of audio output from the smart speaker 110, and may further mask any delays in audio transfer between the devices. An equalizer shift may be applied to the audio output of one or both devices (e.g., the portable electronic device 150 and/or smart speaker 110) to cause the audio reproductive accuracy, spectrum, frequencies (whether bass, midrange, or treble), or the like of the two devices ("audio quality") to be similar or the same during audio transfer, and specifically while audio is fading out from a first device and in from a second device. Such equalization may ensure the audio quality of the two devices mirrors one another or is similar, thereby reducing any sudden shift in perception of the audio during transfer. The equalization may be gradually reduced or eliminated during audio transfer, or may be gradually reduced or eliminated after audio transfer, so that audio quality returns to normal for the outputting device. It should be appreciated that audio may fade in from any device to which the audio is transferred, and may fade out from any device transferring audio. Likewise, an equalization shift to adjust audio quality may be applied to a device transferring audio or a device receiving audio, and may occur while audio is fading in or out from a device. In some embodiments, the equalization shift is strongest when an audio fade begins and is reduced to zero (or near-zero) when the audio fade ends. Audio fading and/or equalization may be applied based on a distance between the first and second devices, such that fade in/fade out of audio, and/or the strength of an equalization shift, increases as distance between the devices decreases, or vice versa. Audio fading and/or equalization shifting may occur with any embodiment discussed herein, and is not limited to the embodiments shown in FIGS. 1A-1C.

Audio transfer between devices may also be indicated to a person through a non-auditory cue, such as a haptic or visual output. For example, a device held by a person, such as a portable electronic device 150, may provide a haptic output to the person when audio transfer is initiated, or while audio transfer is occurring. The haptic output may vary in strength, intensity, frequency, or pattern during audio transfer, for example corresponding to a fading of audio outputted by the device. Similarly, a device, such as a smart speaker 110, may provide a visual output to indicate audio transfer is occurring, has occurred, or is available. The visual output may be of any suitable pattern, color, and/or luminance, and may change with audio fade or may be constant during audio transition. It should be appreciated that varying a haptic our visual output is not necessary and may not occur in embodiments that provide such outputs to indicate audio transfer Likewise, certain embodiments may not provide any haptic or visual output at all during or after audio transfer. Further, it should be appreciated that any suitable device may provide a haptic and/or visual output as a cue that audio transfer is occurring, is available, is about to begin, or has completed. Thus, a smart speaker 110 may provide either or both of a haptic or visual output, as may a portable electronic device 150, as may any other device that is transferring audio (whether sending or receiving such audio), including televisions, appliances, wearable electronic devices, computing systems, tablets, personal digital assistants, and so on.

Figure 2A:
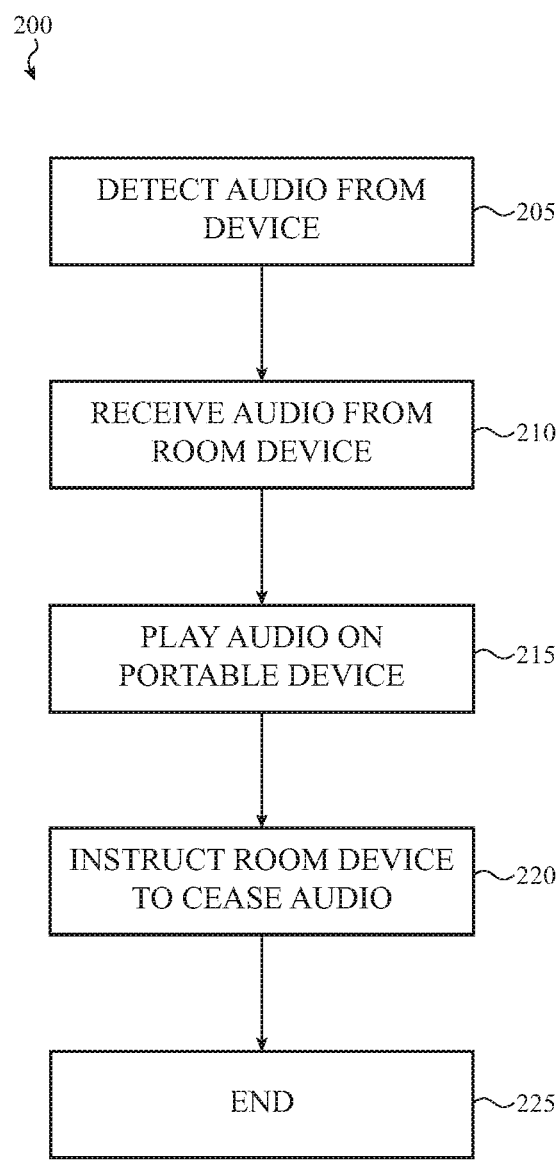
FIG. 2A is a flowchart illustrating a sample method for transferring audio between two devices.

FIG. 2A is a flowchart illustrating one sample method for transferring music between a smart speaker and a portable electronic device, as generally shown FIG. 1B. Initially, the method 200 begins in operation 205, in which a portable electronic device is brought into proximity with a smart speaker. Next, in operation 210, the smart speaker and portable device communicate with one another. This communication may be initiated by the portable electronic device in some embodiments, by the smart speaker in other embodiments, and by yet another electronic device in still other embodiments. Further, the communication may facilitate establishing a first transition part for audio outputted by the smart speaker, which is generally and broadly defined as a part of the audio at which the audio may be modified by the smart speaker. In some embodiments, a second transition part at which the portable electronic device may begin audio output may be determined or otherwise established; the first and second transition parts may be the same or may be different. Different transition parts may be used to account for the propagation time of sound through air, to fade in and out audio between the two devices, and so on.

Next, in operation 215, the portable electronic device may output audio starting at the transition part. In operation 220, the smart speaker may modify its audio output, also starting at the transition part. Audio fading and/or an equalization shift may be applied as part of either or both of operations 215 and 220. It should be appreciated that operations 215 and 220 are executed substantially simultaneously in many embodiments although they are shown sequentially. Further, in some embodiments one of operations 215 and 220 may be delayed with respect to one another to account for a first distance between the person and the portable electronic device and/or a second distance between the person and the smart speaker. This delay may compensate for the time it takes for sound to propagate through air. Thus, by introducing a delay between operations 215 and 220, the person may perceive that the transfer of audio from one device to the other occurs instantaneously. Accordingly, it should be understood that in some embodiments operation 220 may come before operation 215. Further, the portable electronic device may thus identify and use a first transition part and the smart speaker may identify and use a second transition part to account for the aforementioned delay.

Audio modification by the smart speaker may take the form of stopping audio output, muting audio output, or raising or lowering audio volume. For example, the smart speaker may lower the audio output volume to be imperceptible to, or difficult to perceive by, the person rather than stopping the audio output.

Following operations 215 and 220 (whichever order they occur in, or if they occur simultaneously), the method terminates in end state 225.

Figure 2B:
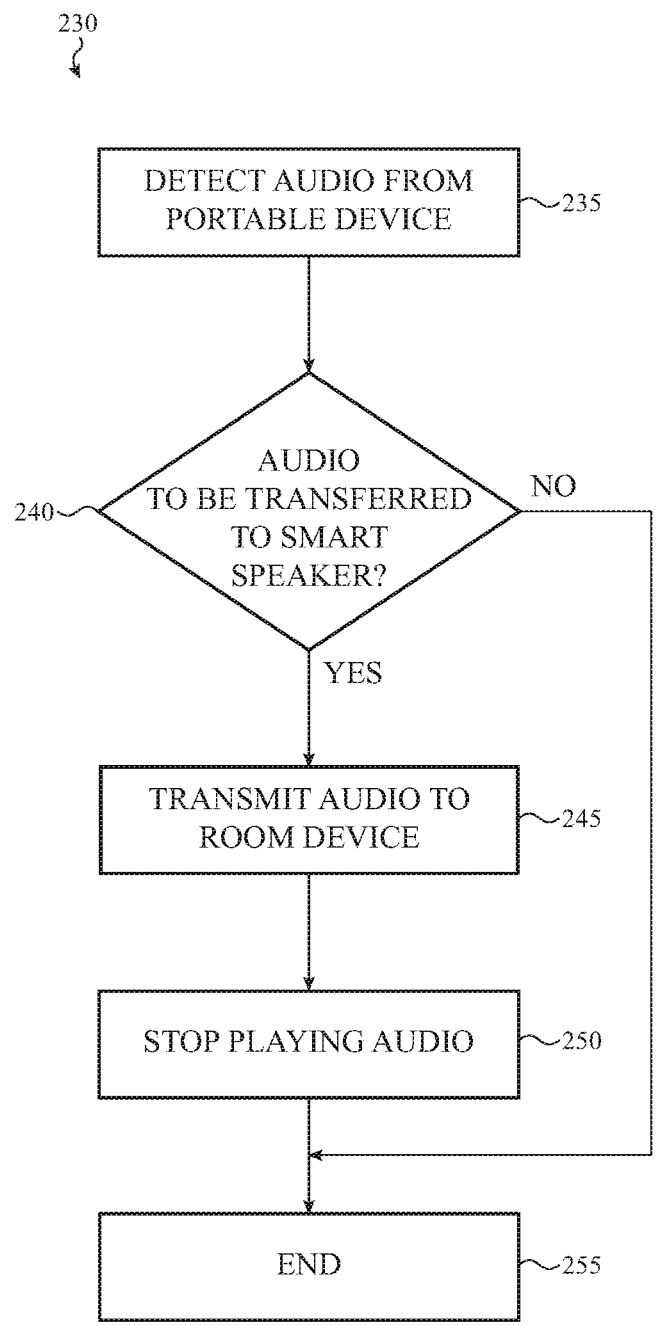
FIG. 2B is a flowchart illustrating a second sample method for transferring audio between two devices.

FIG. 2B is a flowchart illustrating a sample method 230 for transferring audio from a portable electronic device to a smart speaker, for example as discussed above with respect to FIG. 1C. In some ways, the method 230 depicted in FIG. 2B is similar to the method 200 depicted in FIG. 2A. Differences between the methods will be discussed with respect to FIG. 2B.

In operation 235, the portable electronic device determines that it is in proximity with the smart speaker, or vice versa. Presuming that it is, the method 235 proceeds to operation 240, in which it is determined whether audio is to be transferred from the portable electronic device to the smart speaker. A person may indicate that audio is to be transferred through a gesture, motion of the portable audio device, or the like, or proximity between the portable audio device and the smart speaker may be used to infer that audio transfer is to occur.

If no audio transfer from the portable electronic device to the smart speaker is to occur, the method 230 terminates in end state 255. If, however, such audio transfer is to occur, the method proceeds to operation 245.

In operation 245, the audio is outputted on the smart speaker, starting at a transition part or point. The concept of a transition part is discussed above. Further, in operation 250, the portable device ceases playing audio at the transition part, again as described above. As further described above with respect to similar operations in FIG. 2A, operations 245 and 250 may occur substantially simultaneously, may be flipped in order, or one may be delayed with respect to the other. Regardless, operations 245 and 250 are executed in such a manner that audio output between the portable electronic device and the smart speaker occurs substantially instantaneously and without interruption from the perspective of the person.

Following operation 250 (or operation 245, if the two are reversed in order), the method 230 terminates in end state 255.

Figure 3A:
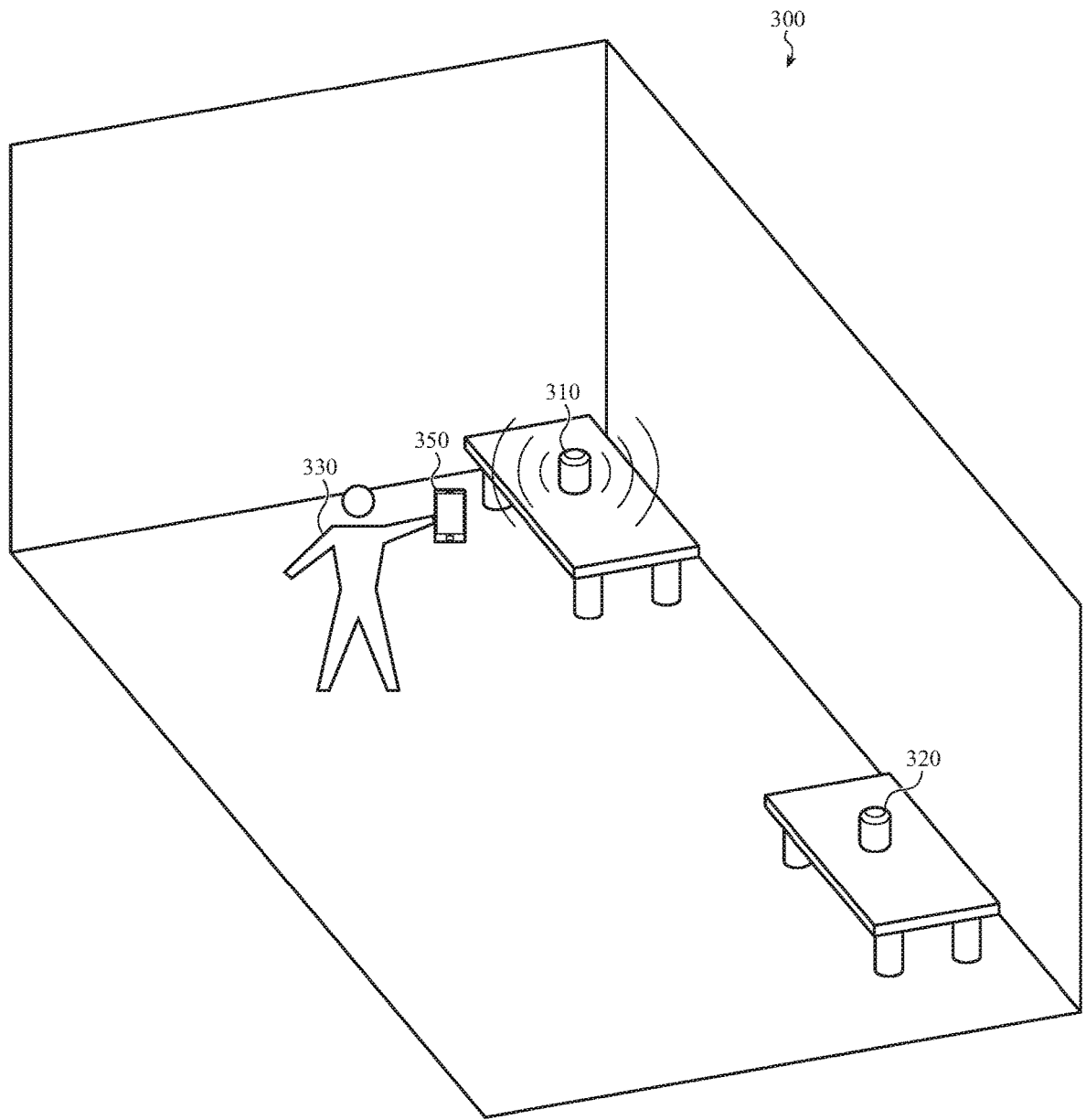
FIG. 3A depicts a person near a first device, listening to audio playing on the first device.
Figure 3B:
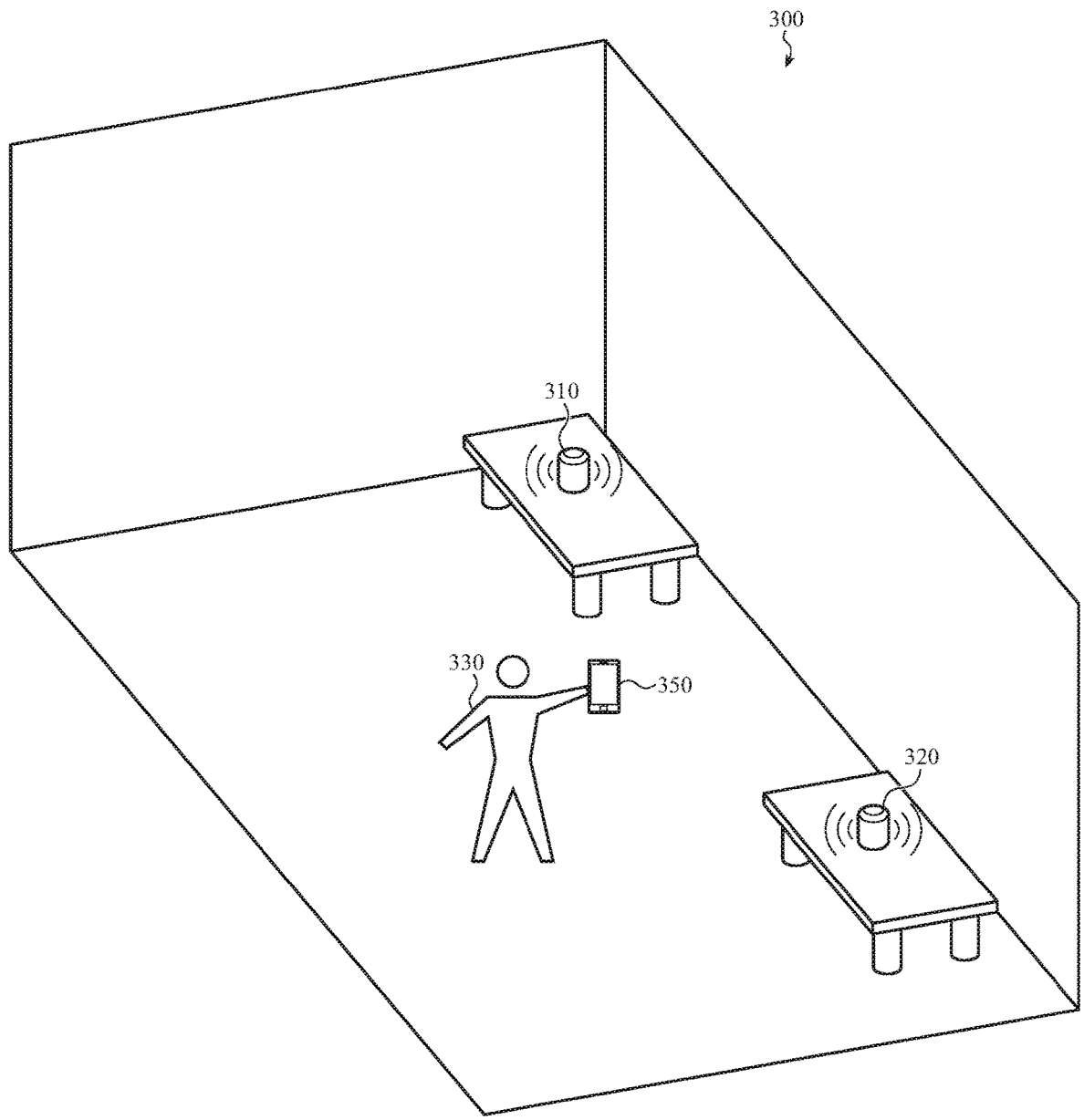
FIG. 3B depicts the person of FIG. 3A between first and second devices that are both playing audio.
Figure 3C:
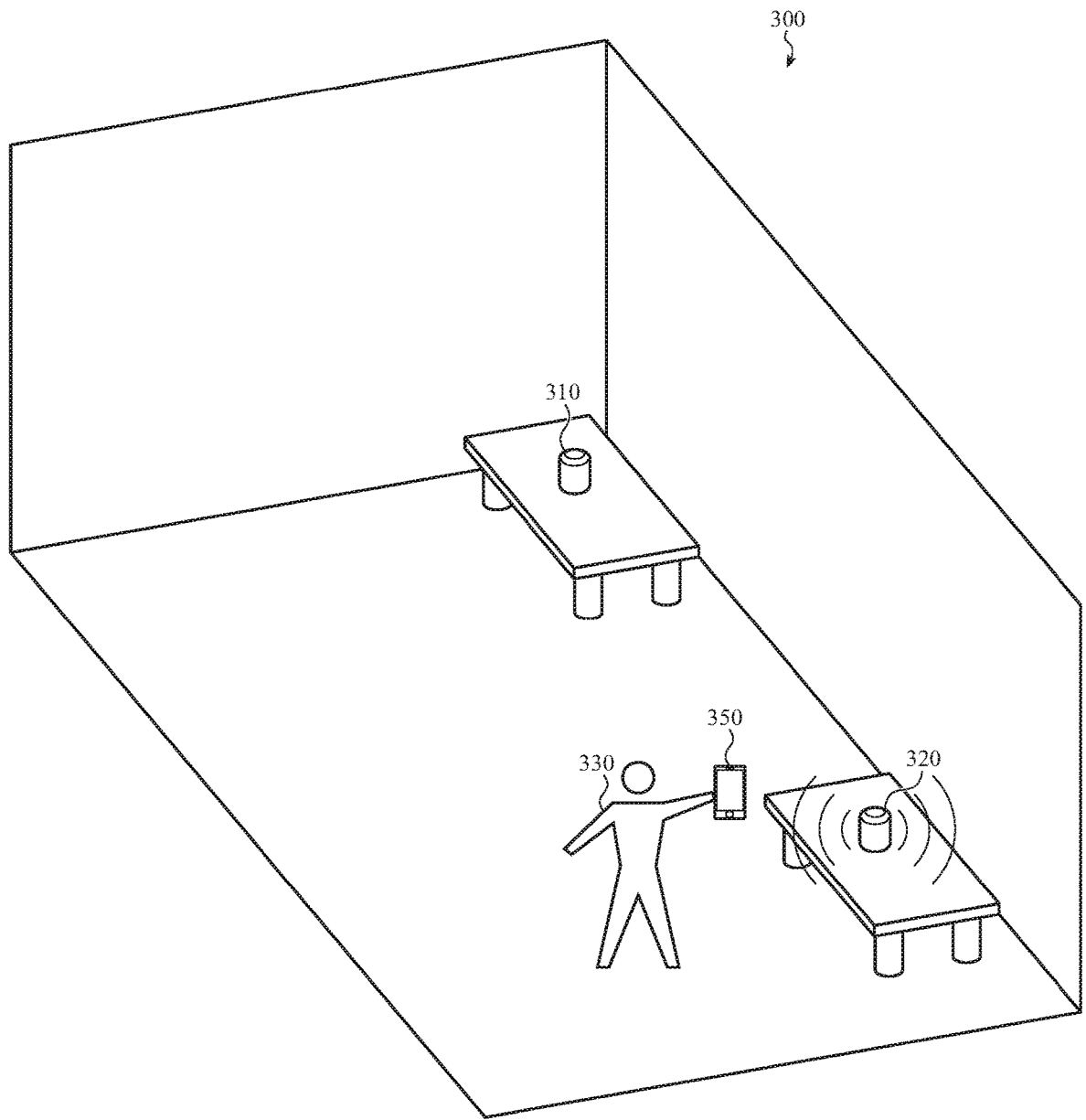
FIG. 3C depicts the person of FIG. 3A near the second device, listening to audio playing on the second device.

FIGS. 3A-3C illustrate a sample system 300 configured to transfer audio from a first smart speaker 310 to a second smart speaker 320. In some embodiments, audio transfers from the first smart speaker 310 to the second smart speaker 320 automatically. In certain embodiments, each smart speaker 310, 320 determines a distance between a person 330 and itself, and these distances are used to set audio output levels of the smart speakers 310, 320 during the audio transfer. Further, in some embodiments audio may be transferred between the two smart speakers 310, 320 in a period of time rather than instantaneously (or substantially instantaneously). It should be appreciated that some embodiments may combine any or all of the aforementioned functionalities.

Initially and as shown in FIG. 3A, a person 330 may be located a first distance from the first smart speaker 310 and a second distance from the second smart speaker 320. When the first distance is below a first threshold, audio may be outputted by the first smart speaker 310, as shown in FIG. 3A. Likewise, when the second distance is greater than a second threshold, the second smart speaker 320 may not output audio, again as shown in FIG. 3A.

As the person 330 moves away from the first smart speaker 310 and towards the second smart speaker 320, the first distance increases and the second distance decreases, as shown in FIG. 3B. In some embodiments and as illustrated, audio output from one or both smart speakers 310, 320 may vary with the distance between the speakers and the person. For example, as the person moves away from the first smart speaker 310, its audio output may decrease in volume. Likewise, as the person 330 moves toward the second smart speaker 320, its audio output may increase in volume; as shown in FIGS. 3A and 3B, the second smart speaker 320 may begin playing audio in the current example. In FIG. 3B, the first distance is less than the first threshold and the second distance is less than the second threshold, so both the first speaker 310 and second speaker 320 output audio.

As the person 330 continues moving away from the first smart speaker 310 and towards the second smart speaker 320, the volume of the audio output from one or both speakers 310, 320 may change further as shown in FIG. 3C. Continuing the description of the current embodiment of the system 300, in FIG. 3C the person 330 has moved such that the first distance (e.g., the distance between the person 330 and the first smart speaker 310) is greater than the first threshold and the second distance (e.g., the distance between the person 330 and the second speaker 320) is below the second threshold. Accordingly, the first speaker 310 ceases outputting audio while the second speaker 320 continues to output audio. Further, in embodiments where volume of an audio output varies with distance, the audio output from the second smart speaker 320 may be louder than it was in the example of FIG. 3B, because the second distance is less in FIG. 3C than in FIG. 3B.

It should be appreciated that audio output may increase as distance between the person 330 and a smart speaker 310, 320 increases, at least in some embodiments. Thus, some embodiments may reverse a change in audio with distance from what is shown in FIGS. 3A-3C, where audio output volume increases as distance decreases.

Further, it should be appreciated that audio output from the first smart speaker 310 and second smart speaker 320 is generally synchronized, so that the audio sounds in phase to the person 330. If the first and second distances vary greatly, then a delay may be introduced to audio output of one of the speakers 310, 320 to account for the variance between the first and second distance (and thus to account for the time it takes for audio to propagate from a speaker to the person). Typically, the smart speaker closer to the person may be delayed in order to have audio from both speakers reach the person simultaneously. As with prior embodiments, audio fading and/or an equalization shift may be applied to the audio output of either or both of the first smart speaker 310 and second smart speaker 320 during audio transfer.

In many embodiments, the first smart speaker 310 and second smart speaker 320 know their distances and/or positions with respect to one another. This may facilitate determining when it is useful or desirable to delay audio output from one of the speakers, as in the above example, as well as coordinating adjustments in audio output volumes of the speakers. Thus, although not necessary and not enabled in all embodiments, it may be useful for the first smart speaker 310 and second smart speaker 320 to sense one another's positions and/or distances; in some embodiments, the first and second smart speakers 310, 320 may communicate with one another to facilitate this. The first and second smart speakers may also communicate with one another to transfer audio between the two or otherwise coordinate audio output. In some embodiments, the first and second smart speakers may implement the same transition part for modifying audio playback (e.g., stopping output from the first smart speaker and starting output from the second smart speaker), while in other embodiments different first and second transition parts may be used. Different transition parts may be used to provide the aforementioned delay, as one example.

Some embodiments of the system 300 shown in FIG. 3C may incorporate one or more sensors to determine the first and second distances, and/or a position of the person 330 relative to one or more of the smart speakers 310, 320. Such sensors may be incorporated into one or both of the first and second smart speakers 310, 320, may be incorporated into a portable electronic device 350 carried by the person (such that the portable electronic device may sense distance/and or position of one or both speakers), or may be separate elements from the speakers or the portable electronic device. Further, in some embodiments one or both of the smart speakers 310, 320 may sense a distance to, and/or position of, the portable electronic device 350 rather than the person, or vice versa. The distance and/or position of the portable electronic device 350 may be used as a proxy for that of the person 330 in such embodiments.

Figure 4A:
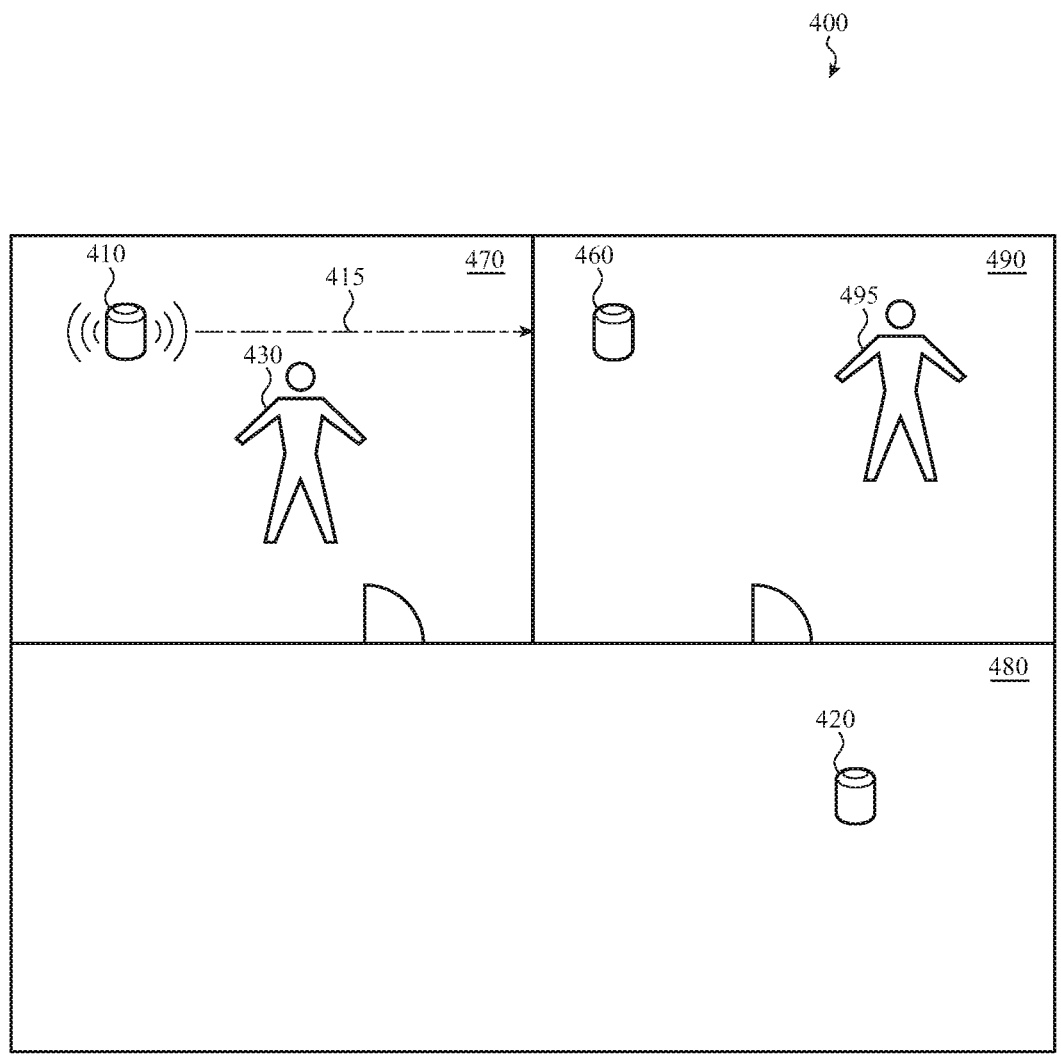
FIG. 4A depicts a first person playing audio on a first device that is located in a first room, and a second person in a second room with a second device that is listening for audio.
Figure 4B:
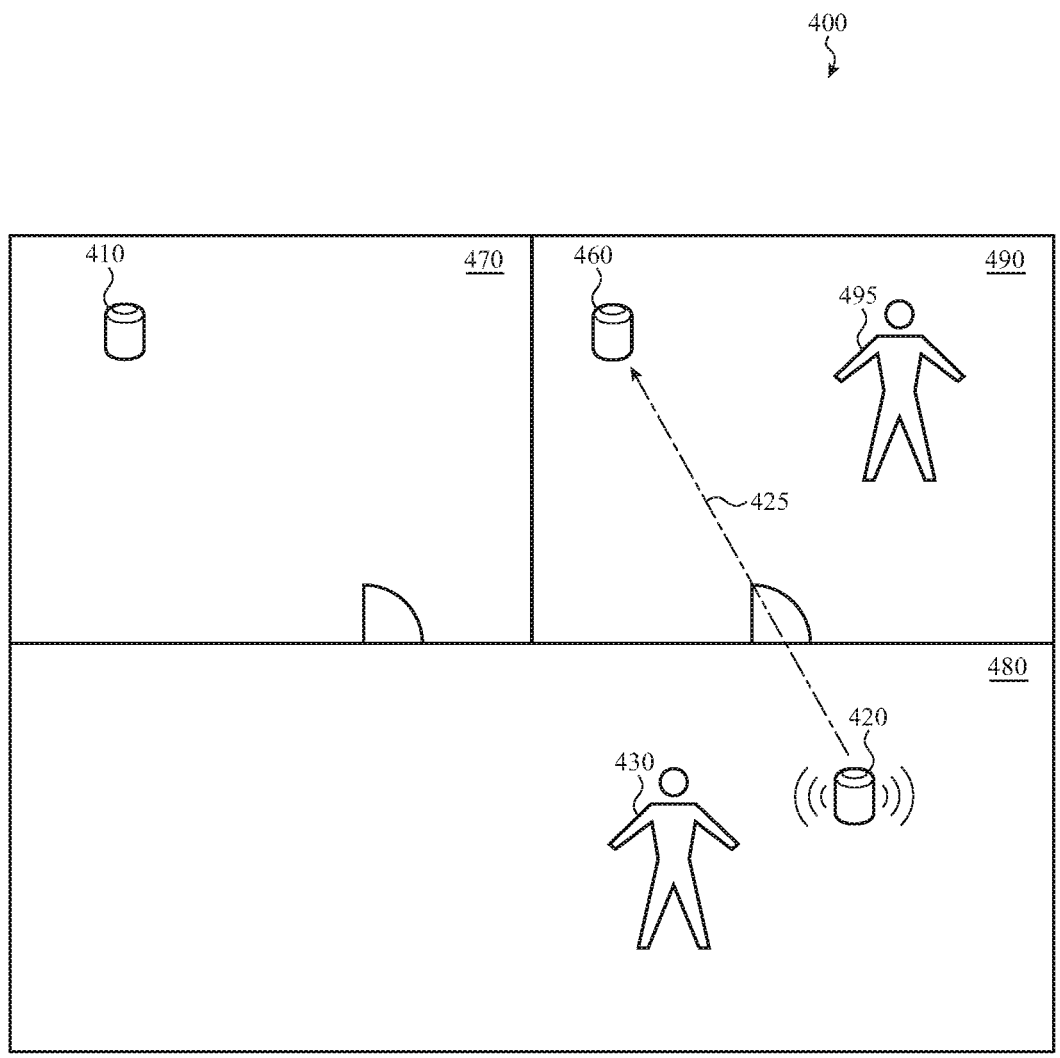
FIG. 4B depicts the first person of FIG. 4A in a third room containing a third device that has transferred the audio from the first device, and the second device detecting the audio.
Figure 4C:
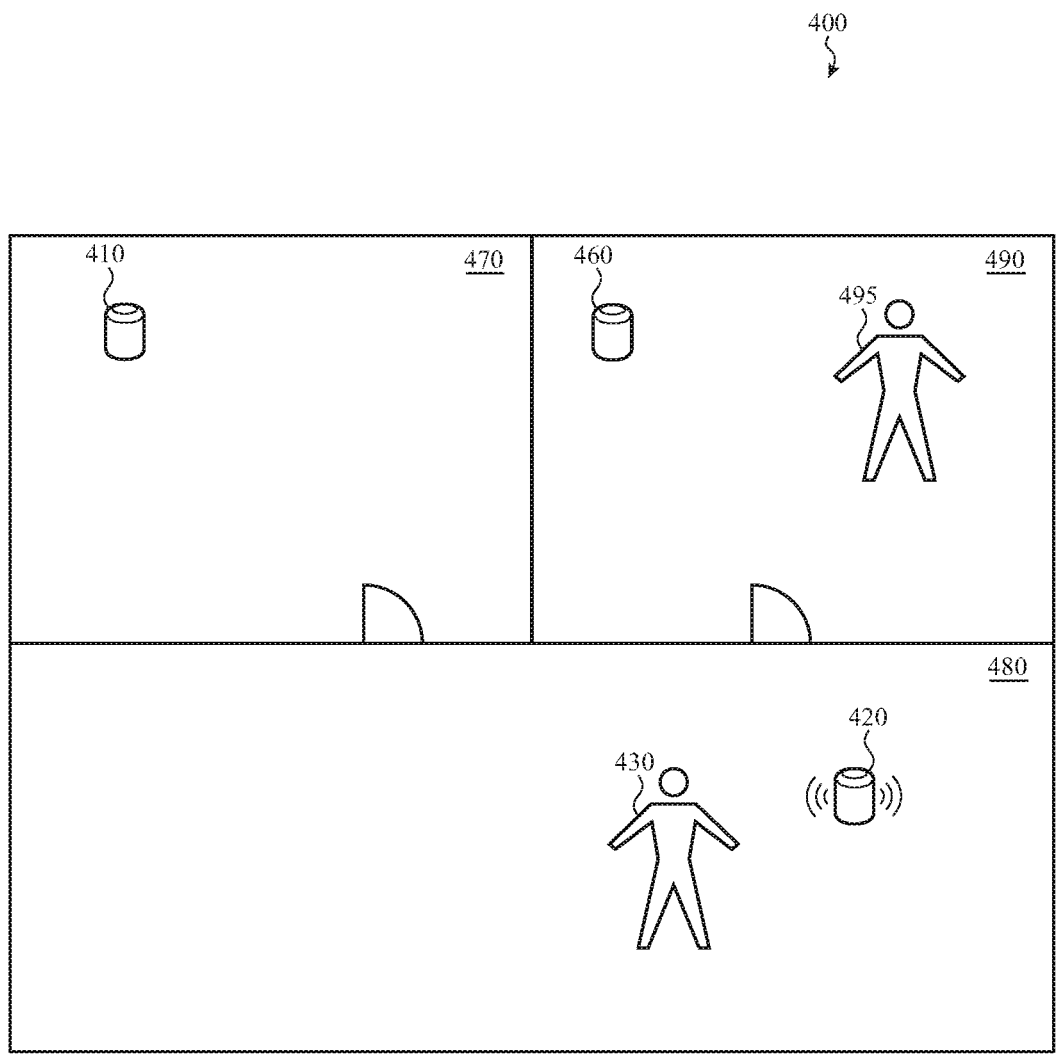
FIG. 4C depicts the third audio device of FIGS. 4A-4B playing audio at a lowered level.

FIGS. 4A-4C illustrate another sample system 400 of embodiments described herein. In the embodiment 400 shown in FIGS. 4A-4C, a smart speaker 460 may be configured to enable a "quiet zone" or "do not disturb" region in which audio from another source (such as another smart speaker 410, 420) is lowered in volume, muted, or stopped. A person may configure a smart speaker to listen for audio output from another smart speaker; when the audio output is detected, the listening smart speaker may instruct the outputting smart speaker to modify the audio output in order to lower it below a threshold or to cease it entirely. Thus, the listening smart speaker may monitor, and enforce, the quiet zone for the person. An example embodiment 400 of this is shown with respect to FIGS. 4A-4C.

The sample embodiment 400 is shown in FIG. 4A and may include a first smart speaker 410, an optional second smart speaker 420, and a third smart speaker 460. As illustrated, a first person 430 may be present in a first location 470 that contains a first smart speaker 410 outputting audio. The term "location" is used throughout, but it should be appreciated that this is for convenience. With respect to this embodiment, locations may be different rooms in a building, portions of a single room, regions of an outdoor locale, and so on.

The first location 470 may be connected to a second location 480 and/or a third location 490. In the example of FIGS. 4A-4C, the first location 470 is a room that is connected to the second location 480, which is also a room of a building. The second location 480 is, in turn, connected to a third location (e.g., third room) 490. Although the embodiment 400 is described with respect to FIGS. 4A-4C has having three locations 470, 480, 490 and three smart speakers 410, 420, 460, it should be appreciated that this is for convenience only. Embodiments may function with two smart speakers, or more, in different locations that need not be rooms.

In the embodiment as depicted in FIG. 4A, the audio output 415 of the first smart speaker 410 is blocked from the third smart speaker 460 by an intervening wall. Presuming there are no other sources of noise, the third room 490 is quiet. As shown in FIG. 4B, the person 430 may move from the first location 470 to the second location 480, thereby changing distances and/or proximities of the person 430 to the first smart speaker 410 and the second smart speaker

420. In response to the changes in distance, the first smart speaker 410 may transfer audio to the second smart speaker 420, as described above with respect to FIGS. 2A-3C. The audio output 415 may fade out rather than abruptly terminating, although this is not required.

As shown in FIG. 4B, audio output 425 from the second smart speaker 420 may reach, and be detected by, the third smart speaker 460. If the audio output 425, as detected by the third smart speaker 460, exceeds a threshold then the third smart speaker 460 may initiate a communication to the second smart speaker 420. This communication may instruct the second smart speaker to adjust its audio output such that the output 425 is below the threshold as measured by the third smart speaker 460. Generally, the threshold is a volume of a sound sensed by a smart speaker, rather than a volume of an output from an audio source. Once the second smart speaker 420 receives this communication, it may adjust its output such that audio reaching the third smart speaker 460 is below the threshold, as indicated by FIG. 4C. This adjustment may take the form of an audio fade or even an equalization shift attenuating certain frequencies that are more likely to be noticed by a listener.

By transmitting a communication to control audio output volume from the second smart speaker 420, the third smart speaker 460 may maintain the "quiet zone" or "do not disturb" region for the second person 495. In some embodiments, the threshold may be set and enabled by the third person 495. In other embodiments, the second smart speaker 460 may set and/or enable the threshold without user input. For example, the second smart speaker 460 may be in communication with a portable electronic device (not shown) associated with the second person 495 and may use data from that device to enable and/or set the threshold. The portable electronic device may indicate or determine that the person 495 is sleeping, studying, reading, or otherwise engaging in an activity that may be disrupted by loud noise or, in some cases, any noise at all. The portable electronic device may provide this information to the smart speaker 460, which may thus enable and/or set the threshold for the "quiet zone." The portable electronic device may actively instruct the third smart speaker 460 to enable the threshold (e.g., enter "quiet zone" mode), or the third smart speaker 460 may request such information from the portable electronic device and then initiate the mode without external instruction. In some embodiments, the quiet zone and associated threshold may be implemented during a designated time, such as during sleeping hours, studying hours, when a calendar of a portable electronic device or smart speaker indicates an appointment occurs, and so on.

Figure 5:
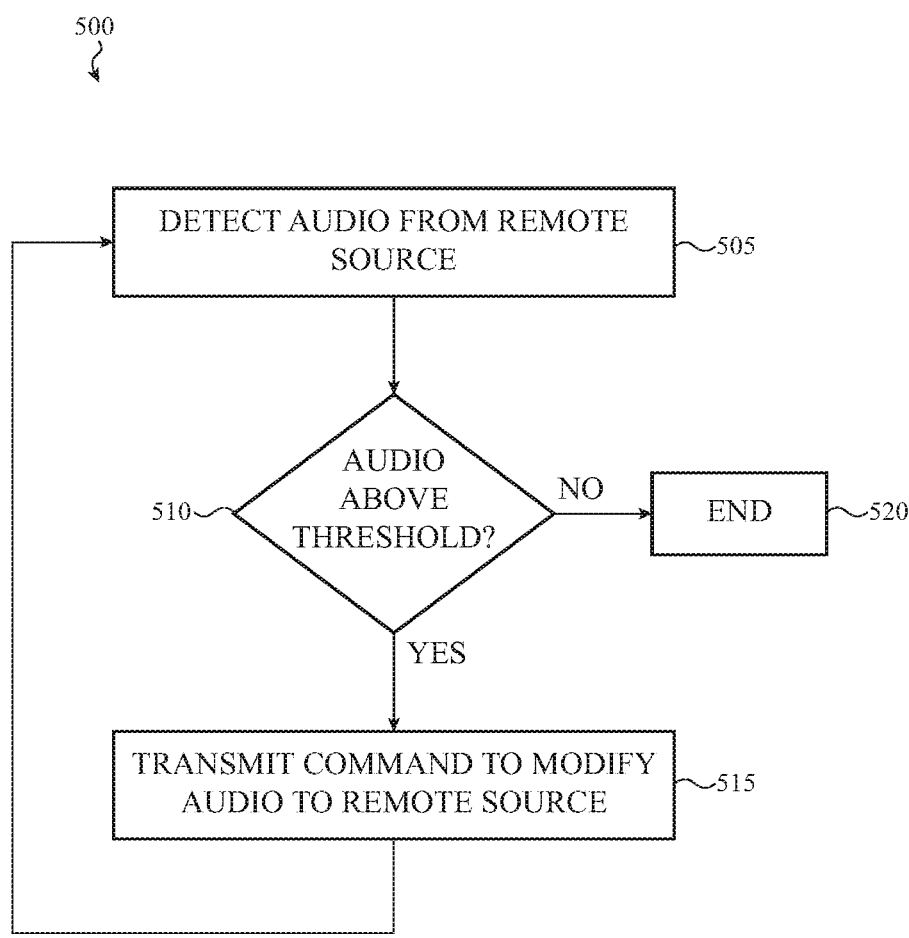
FIG. 5 is a flowchart illustrating a sample method for detecting audio and modifying audio output.

FIG. 5 is a flowchart illustrating a sample method 500 for maintaining a quiet zone through use of a threshold, as described immediately above with respect to FIGS. 4A-4C. The method 500 begins in operation 505, in which a smart speaker detects audio from a remote source.

In operation 510, the smart speaker determines if the audio volume exceeds the threshold. If not, the method 500 ends in end state 520. However, if the audio volume is found to exceed the threshold in operation 510, operation 515 is executed. In operation 515 the smart speaker may transmit a communication to a source of the audio to modify its audio output, thereby enforcing a quiet zone. The source of the audio may be another smart speaker or any other suitable electronic device. After operation 515, the method 500 may return to operation 505.

Quiet zones and other audio modifications, as discussed generally with respect to FIGS. 4A-5, may be controlled and/or reflected through a user interface of an associated electronic device. Where the electronic device is a smart speaker 410, 420, 460, the user interface may be shown on a display of the smart speaker. For example, a display of a smart speaker 420 where the audio is modified may show a threshold on a volume bar meter, or the like, representing a maximum volume allowed for audio outputted by the smart speaker 420. If the display is circular, the threshold may be shown as a ring or the like. Further, the display may use colors to indicate a threshold or that audio has been modified in order to enforce a quiet zone. For example, an indicator may flash, pulse, change colors, or change size to indicate audio output has been modified as described above; the extent of such flashing, pulsing, color change or size change may correspond to a degree to which audio is modified (e.g., larger changes to audio output result in larger changes on the display).

Similarly, if the electronic device in question is the smart speaker 460 enforcing the quiet zone, an associated display may provide visual indication of this enforcement. The smart speaker 460's display may change in any of the aforementioned ways to indicate that audio is detected and a quiet zone is being enforced. In some embodiments, the display may wake or activate from a quiescent state briefly to provide output indicating audio from another speaker is being modified. As yet another option, the smart speaker's 460 display may indicate a direction, distance, and/or volume of audio outputted by another smart speaker 410, 420, and change such indication as that audio is modified. Certain electronic devices, including carried or worn electronic devices, may provide haptic output instead of, or in addition to, a visual display.

In some embodiments another electronic device, such as a smart phone, tablet, laptop or desktop computer, wearable device, or the like may have a display that provides information regarding the presence of a quiet zone, modification of audio to maintain it below a threshold of the quiet zone, and so on. Further, a display may indicate when volume of outputted audio is approaching a threshold to provide a user the ability to modify audio output voluntarily. Further, any display discussed herein can provide an indication of a volume threshold, limit, level, and/or notification of a volume adjustment in accordance with the embodiment described with respect to FIGS. 4A-4C and method described with respect to FIG. 5.

Figure 6:
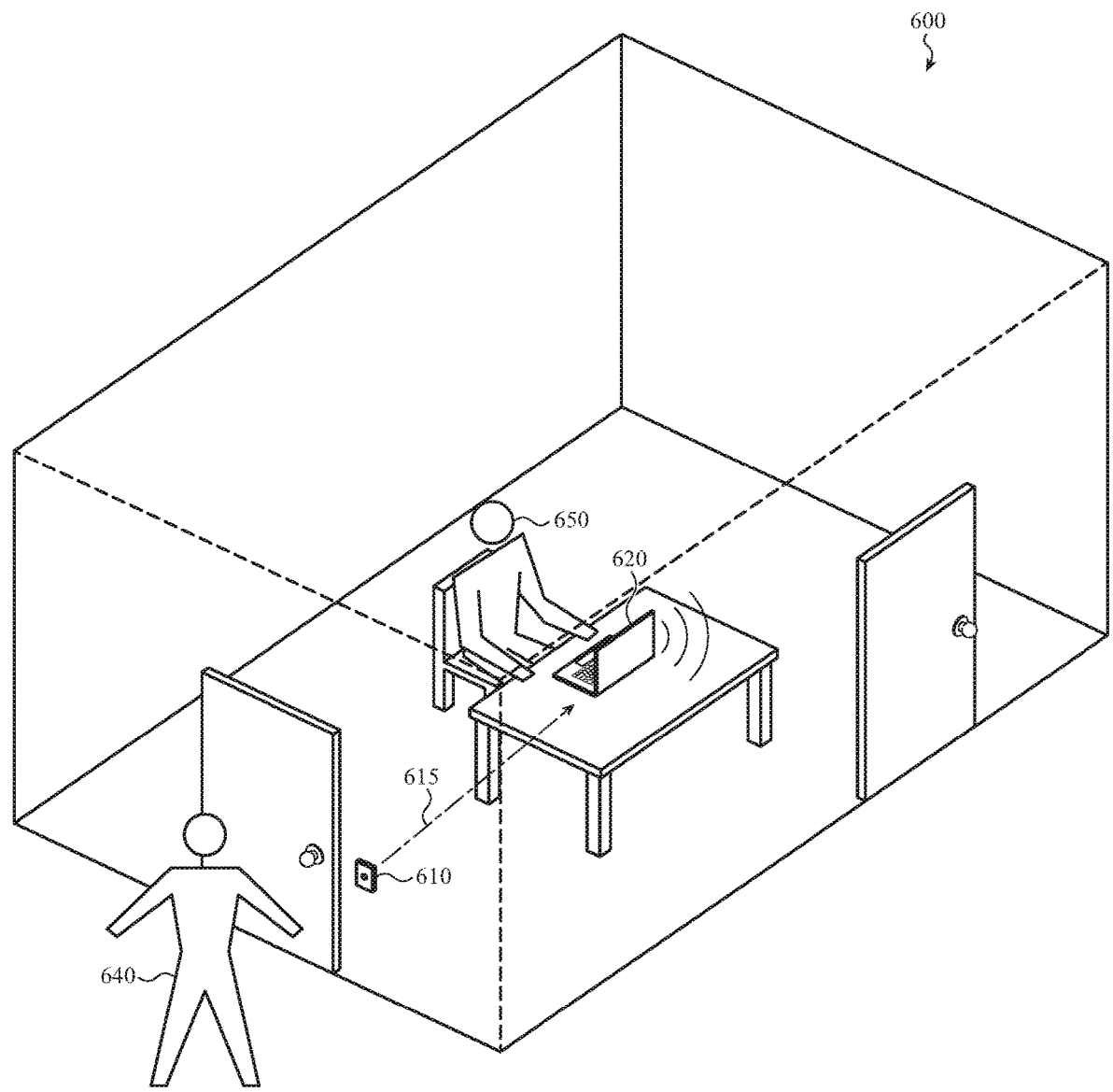
FIG. 6 illustrates an electronic device outputting audio generated by another device.

FIG. 6 illustrates yet another embodiment 600 facilitating audio transfer between two devices. Generally, a first electronic device may communicate with a second electronic device, instructing the second electronic device to output audio. This may be used to create atmospheric effects, relay audio between devices, and so on.

As shown in FIG. 6, a first person 640 may ring a doorbell 610 to alert a second person 650 that he or she is outside. The doorbell 610 may transmit a communication 615 to a smart speaker 620 (here, incorporated into a laptop computing device), to output a doorbell chime to ensure the second person 650 hears the doorbell. This may be especially useful when the second person 650 is in a room distant from the doorbell 610, is wearing headphones, or otherwise is in a location or situation where hearing audio from the doorbell 610 is difficult or impossible. Further, in some embodiments the doorbell 610 may not output any audio at all, instead relying on the smart speaker 620 to do so.

The foregoing example may be generalized; the doorbell 610 may be any suitable electronic device, including a portable electronic device, and the smart speaker 620 may be standalone or incorporated into any suitable electronic device. Further, in some embodiments the doorbell 610 (or other electronic device) may determine the person 640 is in proximity to either the doorbell or smart speaker 620 and initiate the communication 615 without any input from the first person 640.

As another non-limiting example in addition to the one shown in FIG. 6, a first smart speaker may output audio for a movie, television show, game, or other entertainment. The first smart speaker may be in communication with a second smart speaker in another room of a house. During certain parts of the entertainment, the first smart speaker may send a communication to the second smart speaker to output audio to enhance the listener's experience. As a specific, non-limiting instance of this example, during a horror movie the first smart speaker may communicate with the second smart speaker, instructing it to play audio simulating footsteps, creaking noises, or the like, thereby enhancing the realism of the horror movie. Similar effects may be applied to video games, television shows, other genres of movies, virtual reality experiences, videoconferencing, teleconferencing, and so on.

Figure 7:
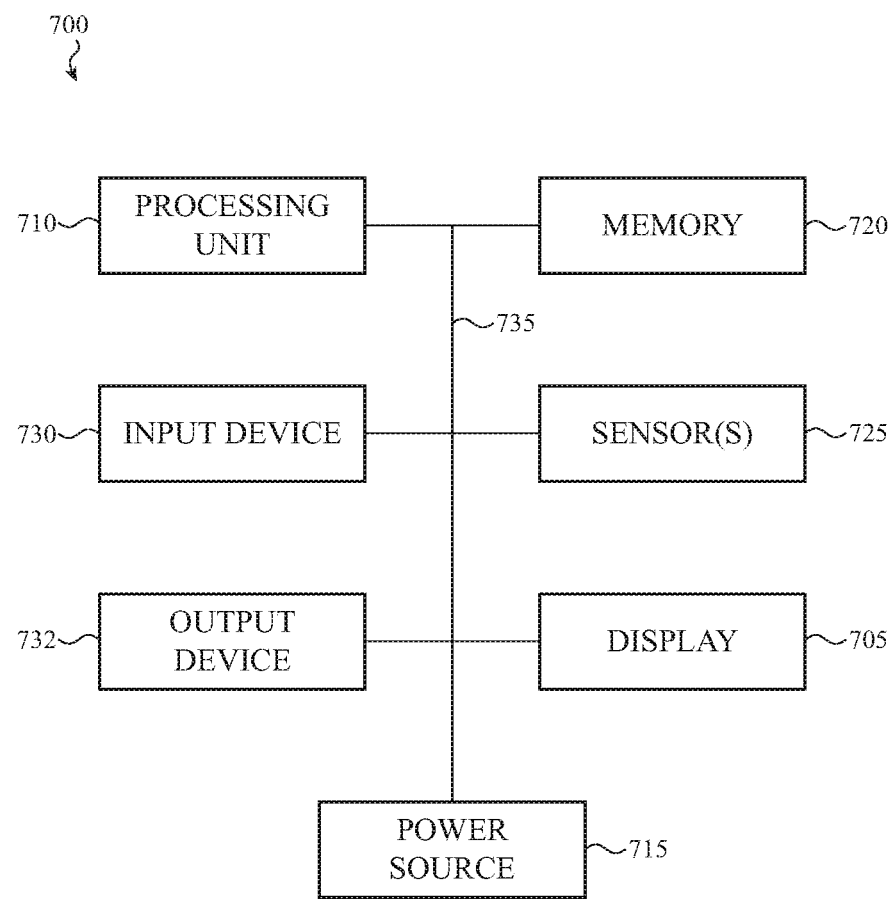
FIG. 7 shows a sample electrical block diagram of an electronic device that may be used in environment control systems, such as those discussed herein.

FIG. 7 shows a sample electrical block diagram of an electronic device 700 that may be used in environment control systems, such as those discussed herein. The electronic device may in some cases take the form of any suitable electronic device, including smart home control devices, smart speakers, wearable electronic devices, timekeeping devices, health monitoring or fitness devices, portable computing devices, mobile phones (including smart phones), tablet computing devices, digital media players, virtual reality devices, wearable devices (including watches, glasses, and jewelry), audio devices (including earbuds and headphones), and the like. The electronic device 700 can include a display 705 (e.g., a light-emitting display), a processing unit 710, a power source 715, a memory 720 or storage device, a sensor 725, an input device 730, and an output device 732 (e.g., an audio device).

The processing unit 710 can control some or all of the operations of the electronic device 700. The processing unit 710 can communicate, either directly or indirectly, with some or all of the components of the electronic device 700. For example, a system bus or other communication mechanism 735 can provide communication between the processing unit 710, the power source 715, the memory 720, the sensor 725, and the input device(s) 730 and the output device(s) 732.

The processing unit 710 can be implemented as any electronic device capable of processing, receiving, or transmitting data or instructions. For example, the processing unit 710 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 700 can be controlled by multiple processing units. For example, select components of the electronic device 700 (e.g., a sensor 725) may be controlled by a first processing unit and other components of the electronic device 700 (e.g., the display 705) may be controlled by a second processing unit, where the first and second processing units may or may not be in communication with each other. In some cases, the processing unit 710 may determine a biological parameter of a user of the electronic device, such as a voice print or facial pattern for the user.

The power source 715 can be implemented with any device capable of providing energy to the electronic device 700. For example, the power source 715 may be one or more batteries or rechargeable batteries. Additionally or alternatively, the power source 715 can be a power connector or power cord that connects the electronic device 700 to another power source, such as a wall outlet.

The memory 720 can store electronic data that can be used by the electronic device 700. For example, the memory 720 can store electrical data or content such as, for example, audio and video files, documents and applications, device settings and user preferences, timing signals, control signals, and data structures or databases. The memory 720 can be configured as any type of memory. By way of example only, the memory 720 can be implemented as random access memory, read-only memory, Flash memory, removable memory, other types of storage elements, or combinations of such devices.

The electronic device 700 may also include one or more sensors 725 positioned almost anywhere on the electronic device 700. The sensor(s) 725 can be configured to sense one or more type of parameters, such as but not limited to, pressure, light, touch, heat, movement, relative motion, biometric data (e.g., biological parameters), and so on. For example, the sensor(s) 725 may include a heat sensor, a position sensor, a light or optical sensor, an accelerometer, a pressure transducer, a gyroscope, a magnetometer, a health monitoring sensor, and so on. Additionally, the one or more sensors 725 can utilize any suitable sensing technology, including, but not limited to, capacitive, ultrasonic, resistive, optical, ultrasound, piezoelectric, and thermal sensing technology.

In various embodiments, the display 705 provides a graphical output, for example associated with an operating system, user interface, and/or applications of the electronic device 700. In one embodiment, the display 705 includes one or more sensors and is configured as a touch-sensitive (e.g., single-touch, multi-touch) and/or force-sensitive display to receive inputs from a user. For example, the display 705 may be integrated with a touch sensor (e.g., a capacitive touch sensor) and/or a force sensor to provide a touch- and/or force-sensitive display. The display 705 is operably coupled to the processing unit 710 of the electronic device 700.

The display 705 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 705 is positioned beneath and viewable through a cover sheet that forms at least a portion of an enclosure of the electronic device 700.

In various embodiments, the input devices 730 may include any suitable components for detecting inputs. Examples of input devices 730 include audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 730 may be configured to detect one or more particular types of input and provide a signal (e.g., an input signal) corresponding to the detected input. The signal may be provided, for example, to the processing unit 710.

As discussed above, in some cases, the input device(s) 730 include a touch sensor (e.g., a capacitive touch sensor) integrated with the display 705 to provide a touch-sensitive display. Similarly, in some cases, the input device(s) 730 include a force sensor (e.g., a capacitive force sensor) integrated with the display 705 to provide a force-sensitive display.

The output devices 732 may include any suitable components for providing outputs. Examples of output devices 732 include audio output devices (e.g., speakers), visual output devices (e.g., lights or displays), tactile output devices (e.g., haptic output devices), communication devices (e.g., wired or wireless communication devices), and so on, or some combination thereof. Each output device 732 may be configured to receive one or more signals (e.g., an output signal provided by the processing unit 710) and provide an output corresponding to the signal.

In some cases, input devices 730 and output devices 732 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, optical, and Ethernet connections.

The processing unit 710 may be operably coupled to the input devices 730 and the output devices 732. The processing unit 710 may be adapted to exchange signals with the input devices 730 and the output devices 732. For example, the processing unit 710 may receive an input signal from an input device 730 that corresponds to an input detected by the input device 730. The processing unit 710 may interpret the received input signal to determine whether to provide and/or change one or more outputs in response to the input signal. The processing unit 710 may then send an output signal to one or more of the output devices 732, to provide and/or change outputs as appropriate.

As described above, one aspect of the present technology is the gathering and use of data available from various sources to adjust environmental conditions, and the like. The present disclosure contemplates that in some instances this gathered data may include personal information data that uniquely identifies or can be used to contact or locate a specific person. Such personal information data can include demographic data, location-based data, telephone numbers, email addresses, Twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide audio outputs that are tailored to the user; as one example, a smart speaker and/or portable electronic device may use biometric data to recognize a person and adjust, transfer, or output custom audio in accordance with any embodiment described herein. Further, other uses for personal information data that benefit the user are also contemplated by the present disclosure. For instance, health and fitness data may be used to customize audio outputs and/or transfer between smart speakers, or between a portable electronic device and a smart speaker.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of adjusting environmental conditions, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, audio outputs may be provided based on non-personal information data or a bare minimum amount of personal information, such as events or states at the device associated with a user, other non-personal information, or publicly available information.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for modifying an audio output of a smart speaker, comprising:
   determining that a portable electronic device is in proximity with the smart speaker outputting audio, wherein the smart speaker is outputting the audio;
   initiating, by the portable electronic device, a communication to the smart speaker;
   outputting the audio from the portable electronic device after initiating the communication;
   transferring audio output from the smart speaker to the portable electronic device by fading in the audio from the portable electronic device while simultaneously fading out the audio from the smart speaker, wherein an equalizer shift is applied to the audio being outputted from the portable electronic device while fading in the audio; and
   automatically eliminating the equalizer shift while transferring the audio output from the smart speaker to the portable electronic device.

2. The method of claim 1, wherein:
   the communication is initiated by the portable electronic device in response to determining that the portable electronic device is in proximity with the smart speaker; and
   the method further comprises:
      identifying, by the portable electronic device, the audio outputted by the smart speaker;
      identifying, by the portable electronic device, a transition part of the audio;
      determining, by the portable electronic device, whether the portable electronic device stores a copy of the audio;
      in the event the portable electronic device stores a copy of the audio, initiating output of the audio from the portable electronic device at the transition part;
      further in the event the portable electronic device stores the copy of the audio, stopping output of the audio from the smart speaker at the transition part; and
      otherwise, obtaining the copy of the audio on the portable electronic device; and
      after obtaining the copy of the audio on the portable electronic device, performing the operations of identifying the transition part of the audio, initiating output of the audio from the portable electronic device at the transition part, and stopping the output of the audio from the smart speaker at the transition part.

3. The method of claim 1, wherein the operation of determining that the portable electronic device is in proximity with the smart speaker comprises detecting the audio.

4. The method of claim 1, wherein the operation of determining that the portable electronic device is in proximity with the smart speaker comprises transmitting an optical communication from the smart speaker to the portable electronic device.

5. The method of claim 1, wherein:
   the smart speaker is a first smart speaker;
   the communication is a first communication; and
   the method further comprises:
      determining that the portable electronic device is in proximity to a second smart speaker;
      transmitting a second communication from the portable electronic device to the second smart speaker;
      outputting the audio from the second smart speaker; and
      stopping outputting the audio from the portable electronic device.

6. The method of claim 5, further comprising the operation of determining a second transition part of the audio; wherein:
   the portable electronic device stops outputting the audio at the second transition part; and
   the second smart speaker begins outputting the audio at the second transition part.

7. The method of claim 6, wherein a first transition part and the second transition part are identified such that the audio is continuously seamlessly outputted.

8. The method of claim 1, wherein applying the equalizer shift causes the audio quality of the smart speaker and the portable electronic device to be the same while transferring the audio output.

9. A method for transitioning audio between a first smart speaker and a second smart speaker, comprising:
   determining a first distance between a person and the first smart speaker;
      determining the first distance is less than a first threshold and outputting audio from the first smart speaker;
   determining a second distance between the person and the second smart speaker;
   determining the second distance is less than a second threshold and outputting the audio from the second smart speaker;
   causing a volume of the audio outputted from the first smart speaker to increase with a decrease of the first distance, and a volume of the audio outputted from the second smart speaker to decrease with an increase of the second distance while the first smart speaker and the second smart speaker are outputting the audio simultaneously;
   detecting, by a third smart speaker, the volume of the audio outputted from the first smart speaker being above a predetermined threshold level during a designated time period; and
   instructing, by the third smart speaker, the first smart speaker to decrease the volume of the audio outputted from the first smart speaker to maintain the audio volume under the predetermined threshold level during the designated time period.

10. The method of claim 9, further comprising introducing a delay into outputting of the audio from one of the first smart speaker or the second smart speaker; wherein:

the delay is based on at least one of the first distance or the second distance; and the delay is configured to cause the audio output from the first smart speaker and the audio output from the second smart speaker to sound synchronized to the person.

11. The method of claim 9, wherein the operation of determining the first distance of the person from the first smart speaker comprises determining a distance of a portable electronic device carried by the person from the first smart speaker.

12. The method of claim 11, where the operation of determining the distance of the portable electronic device from the first smart speaker comprises:

receiving a communication from the portable electronic device at the first smart speaker; and using the communication to estimate the distance of the portable electronic device from the first smart speaker.

13. The method of claim 11, wherein the operation of determining the distance of the portable electronic device from the first smart speaker comprises determining that the portable electronic device is in proximity to the first smart speaker.

14. The method of claim 9, wherein causing the volume of the audio outputted from the first smart speaker to increase with the decrease of the first distance, and the volume of the audio outputted from the second smart speaker to decrease with the increase of the second distance causes the first smart speaker and the second smart speaker to provide the audio at a constant or near constant volume to a location corresponding to the person.

15. The method of claim 9, further comprising causing the volume of the audio outputted from the first smart speaker to decrease with an increase of the first distance, and the volume of the audio outputted from the second smart speaker to increase with a decrease of the second distance while the first smart speaker and the second smart speaker are outputting the audio simultaneously.

16. The method of claim 9, further comprising applying an equalizer shift to the first smart speaker and/or the second smart speaker while the first smart speaker and the second smart speaker are outputting the audio simultaneously.

17. The method of claim 16, wherein applying the equalizer shift causes the audio quality of the first smart speaker and the second smart speaker to be the same while outputting the audio simultaneously by the first and the second smart speakers.

* * * * *